(12) United States Patent
Nguyen

(10) Patent No.: US 10,952,043 B2
(45) Date of Patent: Mar. 16, 2021

(54) VEHICLE TO EVERYTHING (V2X) COMMUNICATION METHOD AND SYSTEM

(71) Applicant: NEC Corporation, Tokyo (JP)

(72) Inventor: Phong Nguyen, Victoria (AU)

(73) Assignee: NEC CORPORATION, Tokyo (JP)

( * ) Notice: Subject to any disclaimer, the term of this patent is extended or adjusted under 35 U.S.C. 154(b) by 454 days.

(21) Appl. No.: 15/746,856

(22) PCT Filed: Mar. 17, 2016

(86) PCT No.: PCT/JP2016/059783
§ 371 (c)(1),
(2) Date: Jan. 23, 2018

(87) PCT Pub. No.: WO2017/033486
PCT Pub. Date: Mar. 2, 2017

(65) Prior Publication Data
US 2020/0084738 A1   Mar. 12, 2020

(30) Foreign Application Priority Data

Aug. 21, 2015   (AU) .............................. 2015903398

(51) Int. Cl.
*H04W 4/40*   (2018.01)
*H04W 76/14*   (2018.01)
(Continued)

(52) U.S. Cl.
CPC .......... *H04W 4/40* (2018.02); *H04W 56/002* (2013.01); *H04W 56/0015* (2013.01); *H04W 64/003* (2013.01); *H04W 76/14* (2018.02)

(58) Field of Classification Search
CPC .......... H04W 56/0015; H04W 56/002; H04W 76/14; H04W 64/003; H04W 4/40
See application file for complete search history.

(56) References Cited

U.S. PATENT DOCUMENTS

2003/0072255 A1   4/2003   Ma et al.
2010/0067515 A1   3/2010   Chin et al.
(Continued)

FOREIGN PATENT DOCUMENTS

CN   101917264 A   12/2010
CN   102209293 A   10/2011
(Continued)

OTHER PUBLICATIONS

Japanese Office Action for JP Application No. 2018-508781 dated Jan. 7, 2020 with English Translation.
(Continued)

*Primary Examiner* — Ian N Moore
*Assistant Examiner* — Brian T Le

(57) ABSTRACT

Data communication methods and systems are provided for use in an LTE-based vehicle-to-everything (V2X) communication. The method (300) includes: receiving (315), on the data interface and according to a predefined timing reference ($T_{REF}$) a synchronization signal; determining (317) a timing synchronization according to the synchronization signal; and transmitting or receiving data according to the timing synchronization. Furthermore, the method may include receiving, on a data interface, a positioning signal; performing a coarse timing synchronization according to the positioning signal; and refining the coarse timing synchronization according to the synchronization signal. Data may be communication using a configurable V2X communication cycle comprising one or more first V2X-communication periods for event-triggered V2X message transmission and one or more second V2X-communication period s for periodic V2X application message transmission.

4 Claims, 12 Drawing Sheets

(51) Int. Cl.
*H04W 56/00* (2009.01)
*H04W 64/00* (2009.01)

(56) References Cited

U.S. PATENT DOCUMENTS

| | | | |
|---|---|---|---|
| 2011/0176483 A1* | 7/2011 | Palanki | H04W 56/0015 370/328 |
| 2011/0244859 A1 | 10/2011 | Tsuda | |
| 2013/0244653 A1* | 9/2013 | Song | H04W 56/001 455/436 |
| 2015/0271771 A1* | 9/2015 | Park | H04W 56/0015 370/350 |
| 2016/0150451 A1 | 5/2016 | Barreto De Miranda Sargento et al. | |
| 2017/0034825 A1 | 2/2017 | Harada et al. | |

FOREIGN PATENT DOCUMENTS

| | | | |
|---|---|---|---|
| CN | 104244181 | A | 12/2014 |
| JP | 2012-503425 | A | 2/2012 |
| KR | 2011-0027203 | A | 3/2011 |
| WO | 2015/019234 | A1 | 2/2015 |
| WO | 2015/098340 | A1 | 7/2015 |

OTHER PUBLICATIONS

3GPP TSG RAN WG1 Meeting #82, R1-154290, "Potential enhancements for PC5-based V2V", Agenda item: 7.2.8.2, Source: LG Electronics, Aug. 24-28, 2015, Beijing, China.
3GPP TSG-RAN WG2#85bis, R2-141601, "Device to Device Discovery: Steps and Resource Allocation", Agenda Item: 7.4.3, Source: Motorola Mobility, Mar. 31-Apr. 4, 2014, Valencia, Spain.
3GPP TSG RAN WG1 Meeting #75, RI-135532, "Design considerations for D2DSS", Agenda Item: 6.2.8.1.1, Source: Huawei, HiSilicon, Nov. 11-15, 2013, San Francisco.
3GPP TSG RAN WG1 Meeting #82 R1-154194, "Deployment scenarios of L TE~based V2X", Agenda Item: 7.2.8.1.1. Source: NEC, Aug. 24-28, 2015, Beijing, China.
International Search Report for PCT Application No. PCT/JP2016/059783, dated Jun. 21, 2016.
Written opinion for PCT Application No. PCT/JP2016/059783.
Chinese Office Action for CN Application No. 201680048304.2 dated Dec. 3, 2019 with English Translation.
Extended European Search Report for EP Application No. EP16838833.8 dated Mar. 15, 2019.

* cited by examiner

VEHICLE TO EVERYTHING (V2X) COMMUNICATION METHOD AND SYSTEM

This application is a National Stage Entry of PCT/JP2016/059783 filed on Mar. 17, 2016, which claims priority from Australian Patent Application 2015903398 filed on Aug. 21, 2015, the contents of all of which are incorporated herein by reference, in their entirety.

TECHNICAL FIELD

The present invention relates to data communication. In particular, the present invention relates to LTE-based Vehicle to Everything (V2X) communication.

BACKGROUND ART

| | Background Art |
|---|---|
| 3GPP | 3$^{rd}$ Generation Partnership Project |
| CAM | Cooperative Awareness Message |
| CAN-Bus | Controller Area Network Bus |
| D2D | Device to Device communication |
| DFN | D2D Frame number |
| DL | DownLink |
| DSRC | Dedicated Short Range Communication |
| GPS | Global Position System |
| hh:mm:ss | hour hour:minute minute:second second. |
| HDOP | Horizontal Dilution of Precision |
| HEPE | Horizontal Estimated Position Error |
| I/O | Inputs/Outputs |
| IF | Interface |
| ITS | Intelligent Transport System |
| LTE | Long Term Evolution |
| MAC | Medium Access Control |
| MCS | Modulation and Coding Scheme |
| NHTSA | National Highway Traffic Safety Administration |
| $N_{TRP}$ | Time Resource Pattern number |
| OBU/OBE | On-board Unit/On-board Equipment |
| P25 | Project 25, suit of standard for digital radio communication |
| PC5 | Sidelink air interface |
| PHY | Physical |
| PMR | Private Mobile Radio |
| PRB | Physical Resource Block |
| ProSe | Proximity-based Services or so called LTE D2D or Sidelink communication |
| PSCCH | Physical Sidelink Control Channel |
| PSSCH | Physical Sidelink Shared Channel |
| RSU/RSE | Road-side Unit/Road-side Equipment |
| RX | Receive |
| SA | Scheduling Assignment |
| SFN | System Frame number |
| SL | Sidelink communication or Device to Device communication |
| TBS | Transport Block Size |
| TRP | Time Resource Pattern |
| TS | Technical Specification |
| TX | Transmit |
| UL | UpLink |
| USB | Universal Serial Bus |
| UTC | Coordinated Universal Time |
| Uu | LTE Radio Interface |
| V2H | Vehicle to home communication |
| V2H | Vehicle-to-Home |
| V2I | Vehicle to Infrastructure or Infrastructure to Vehicle communication |
| V2N | Vehicle to Network communication using cellular communication |
| V2P | Vehicle to Pedestrian communication |
| V2P | Vehicle-to-Pedestrians |
| V2V | Vehicle to Vehicle communication |
| V2X | Vehicle to everything, a Collection of V2V, V2I, V2P and V2H |
| VANET | Vehicular Ad-Hoc Network |
| VFN | V2X Frame Number |

| | Background Art |
|---|---|
| WAVE | Wireless Access for Vehicular Environment |
| WiFi | Wireless Fidelity |
| YYYY-MM-DD | YearYearYearYear-MonthMonth-DayDay |

Vehicle-to-Everything (V2X) communication enables vehicles to communicate with other vehicles (i.e. Vehicle-to-Vehicle (V2V) communication), with infrastructure (i.e. Vehicle-to-Infrastructure (V2I), with wireless networks (i.e. Vehicle-to-Network (V2N) communication), with pedestrians (i.e. Vehicle-to-Pedestrian (V2P) communication), and even with the owner's home (i.e. Vehicle-to-Home (V2H)). Examples of infrastructure include roadside units such as traffic lights, toll gates and the like.

V2X communication can be used in a wide range of scenarios, including in accident prevention and safety, convenience, traffic efficiency and clean driving, and ultimately in relation to autonomous/self-driving vehicles. For example, in relate to accident prevention, it has been estimated that appropriate V2X systems can prevent over 80 percent of accidents for unimpaired drivers, by alerting the drivers to hidden dangers that can't be sensed by traditional on-board equipment such as sensors.

In relation to traffic efficiency, an appropriate V2X system in combination with a nationwide data collection and processing network, may facilitate environmental improvements, as well as improvements to public safety, mobility, productivity and convenience by providing optimised traffic routing, increased traffic flow, traffic control and incident management.

In V2V, data may be shared between V2X-equipped vehicles within a half-mile or 800 m radius of each other, which can be used to provide a driver with a global view of traffic and be alerted to the most common causes of accidents in time to take evasive action. In more advanced applications, an evasive action or a chain of evasive actions may be initiated by the receiving vehicle automatically.

SUMMARY OF INVENTION

Technical Problem

The V2X market is still in its infancy comprising only Vehicle-to-Vehicle (V2V) and Vehicle-to-Infrastructure (V2I) communication technologies, the former dominated by aftermarket vendors and the latter by electronic toll collection and electronic payment applications respectively.

It is envisaged that the exchange information in V2X systems may be in the form of standardised Cooperative Awareness Messages (CAMs). CAMs may be periodically broadcasted (and thus periodically received) by a vehicle's On Board Unit (OBU), and be used to inform other vehicles about the current status of the transmitting vehicle. In particular, a CAM may carry information such as a time-stamp, current geographical position, speed, travelling direction, and attributes of the vehicle.

CAMs may also be broadcasted by Road Side Units (RSUs) installed in infrastructure, such as smart traffic light sub-systems, to inform and advise nearby vehicles about the current status, attributes, conditions, warning, notifications and services at up-coming road sections. CAMs may be unicasted or group-casted to a particular vehicle or user device upon an event, providing information or other guidance in relation thereto.

Various radio access technologies, including IEEE 802.11a in DSRC and IEEE 802.11p in WAVE or VANET, have been considered for V2X systems. However, IEEE 802.11 based radio access technologies are unnecessarily complex, and more suitable for non-deterministic message transmission. In particular, V2X services generally require deterministic and low latency message transmission, whereas 802.11 based technology is generally high latency.

Recently, 3rd Generation Partnership Project (3GPP) Long Term Evolution (LTE) technology has been considered for V2X services. 3GPP LTE technology is being deployed all over the world and at a rapid pace, which enables more and more advanced services and internet applications that utilise the high data rate, low latency, enhanced coverage that 3GPP LTE provides.

Furthermore, the recently standardised LTE Release 12 device to device (D2D) communication standards enable devices to directly communication over a side-link (PC5) radio interface and without requiring network coverage. As such, these standards have attracted strong interest from vehicle manufacturers and other road-safety agencies as a candidate for vehicular communication.

Technically, 3GPP Release 12 LTE D2D technology, and especially side link (PC5) interfaces are suitable for event-triggered and/or non-standardised-size V2X messages. However, periodic V2X message transmission and reception is not well suited to 3GPP Release 12 LTE D2D technology, which prevents its use in V2X systems.

As such, there is a need for an improved V2X communication methods and systems.

It will be clearly understood that, if a prior art publication is referred to herein, this reference does not constitute an admission that the publication forms part of the common general knowledge in the art in Australia or in any other country.

The present invention is directed to data communication systems and methods, which may at least partially overcome at least one of the abovementioned disadvantages or provide the consumer with a useful or commercial choice.

Solution to Problem

With the foregoing in view, the present invention in a first aspect, resides broadly in a data communication method for use in an LTE-based vehicle-to-everything (V2X) communication system, the method including:
receiving, on the data interface and according to a predefined timing reference ($T_{REF}$), a synchronization signal;
determining a timing synchronization according to the synchronization signal; and
transmitting or receiving data according to the timing synchronization.

The method may further comprise:
determining, at least in part according to the predefined timing reference ($T_{REF}$), one or more subframes on which the synchronization signal may be provided;
wherein the synchronization signal is received on the one or more subframes.

The method may further comprise transmitting an outgoing synchronization signal on the one or more determined subframes.

The method may further comprise:
receiving, on a data interface, a positioning signal; and
determining a coarse timing synchronization according to the positioning signal;
wherein the timing synchronization is determined according to the coarse timing synchronization and the synchronization signal.

The positioning signal may provide absolute timing and the synchronization signal relative timing.

Reception of the positioning signal and the determining of the coarse timing synchronization may be performed automatically at a power-up event of a device on which the positioning signal is received.

The positioning signal may include a current time in UTC format. The positioning signal may be a GPS signal.

The synchronization signal may be received on a first carrier frequency, and cellular wireless connectivity may be provided on a second carrier frequency.

The first and second carrier frequencies may be preconfigured.

The first and second carrier frequencies may comprise the same carrier frequency.

The predefined timing reference ($T_{REF}$) may be used to determine a time when a first System Frame Number (SFN) cycle or V2X Frame Number (VFN) cycle starts.

A time instance ($T_i$) indicating an incoming radio-frame allocated for V2X synchronization signal mapping, may be determined according to (($T_i-T_{REF}$)mod 1024=⌊V2XSync offset indicator/10⌋), where the V2X offset indicator indicates a start of the first V2X communication cycle within the SFN or VFN cycle.

The method may be executed on a V2X communication device of a road side unit (RSU), and further comprise periodically transmitting synchronization signals to other V2X communication devices within a proximity of the RSU.

The method may be executed on a V2X communication device of a vehicle, and further comprise scanning preconfigured carrier frequencies for the synchronisation signal in subframes and radio frames allocated for V2X synchronisation signal mapping.

The synchronisation signal may be used during an implementation dependent scanning period as reference time for transmitting and/or receiving V2X application messages.

The synchronisation signal may originate from another vehicle equipped with a V2X communication device.

Timing synchronization maintenance may be achieved by the vehicle equipped with a V2X communication device periodically contending with other vehicles equipped with a V2X communication device for transmission of synchronization signals.

The method may further comprise failing to detect a synchronisation signal during the implementation dependent scanning period, and subsequently transmitting a synchronization signal periodically, wherein the transmitted synchronization signal provides a reference time for transmitting and/or receiving V2X application messages.

A preconfigured V2X communication cycle may be defined having minimum duration of 100 ms, and a plurality of V2X communication cycles may be time-multiplexed, frequency-multiplexed, or time-frequency multiplexed to fit into one SFN or VFN cycle duration of 1024×10 ms.

The preconfigured V2X communication cycle may comprise:
one or more first V2X-communication periods for event-triggered V2X message transmission;
one or more second V2X-communication periods for periodic V2X application message transmission.

The first V2X-communication period may comprise:
an SA pool for fast signalling of associated control channels transmission; and an associated data pool for data channels carrying V2X application messages.

The second V2X-communication period may comprise a data pool for data channels carrying V2X application messages.

The method may comprise blind-decoding V2X application messages in the second V2X-communication period.

The second V2X-communication period may comprise sub-periods of duration $N_{TRP}=\{6, 7, \text{ or } 8\}$ subframes, wherein the last sub-period is truncated to fit into the second V2X-communication period.

Data channels within the second V2X-communication period may be uniquely indexed in a sub-period in time for $N_{TRP}$ subframes and in frequency for $N_{PRB-CH}$ physical resource blocks (PRBs), and wherein the channel index is reset at each sub-period start.

The data channels may be pre-configurable to occupy a subframe in time and span over $N_{PRB-CH}$ PRBs in frequency.

Two or more second V2X-communication periods may be configured within a V2X communication cycle, wherein a starting channel index of one of the two or more second V2X-communication periods continues from a highest channel index of another of the two or more second V2X-communication periods.

A number of uniquely labeled channels in the second V2X-communication period within the V2X-communication cycle may form a contention window for periodic V2X application message transmission.

The contention window may be partitioned into a non-overlapping window for high priority message transmission, and partially overlapping windows for normal and low priority messages transmission.

A V2X-communication device transmitting V2X application messages may periodically within a V2X communication cycle randomly select a channel index within an appropriate contention window for its first transmission, and identify channels with the same selected channel index for its retransmissions.

Data channels within the second V2X-communication period may be alternatively indexed on sub-periods starting in time for $N_{TRP}$ subframes and then in frequency on $N_{PRB-CH}$ physical resource blocks (PRBs), wherein the starting channel index of a following sub-period continues from a highest channel index value in a previous sub-period.

A second number of uniquely labelled channels in second V2X-communication period within a V2X-communication cycle may form another contention window for another periodic V2X application message transmission.

A V2X-communication device transmitting V2X application messages randomly may select a channel index within a prioritised contention window for periodic transmission within a V2X communication cycle of the second V2X-communication period.

The method may further comprise determining, within a sub-period $N_{TRP}(i)$ that the selected channel index belongs, "Time Resource Pattern Indexes" which contain the selected channel index.

The V2X communication device may randomly select a "Time Resource Pattern Index" of the "Time Resource Pattern Indexes" for first and subsequent V2X application message transmission.

The V2X communication device may utilize unused data resources in the data pool for periodic V2X application messages transmission.

The V2X communication device may monitor the SA-pool to identify the unused data resources.

Channel indexes of the unused channels may be added to a common contention window within a V2X-communication cycle.

In another form, the invention resides broadly in a vehicular communication device for being installed on a vehicle and interfacing with the vehicle's information system implementing the data communication method of the first aspect.

The vehicular communication device may be capable of concurrent V2X communication and cellular communication, and configured to act as relay node for providing communication between other vehicular communication devices and a remote management centre.

In another form, the invention resides broadly in a road side unit, configured to interface with road safety systems, implementing the data communication method of the first aspect.

In another form, the invention resides broadly in an LTE-based vehicular wireless communication system including a plurality of vehicles and a plurality of roadside units implementing the method of the first aspect, a cellular base station and a remote management center, wherein the cellular base station provides providing wireless network connectivity between at least some of the plurality of vehicles and the remote management center.

Furthermore, in yet another form, the present invention resides broadly in system timing structure, timing synchronisation and data communication methods for use in a vehicular wireless communication system, the vehicular wireless communication system including plurality of vehicles, each of which may be equipped with a standard or extended V2X-communication device for directly communicating with other vehicles, with road side units (RSUs) and/or with portable devices capable of V2X-communication carried by individual, to at least regularly and periodically indicate its presence and the presence of other vehicle without equipped V2X-communication device but being detected by traditional vehicular equipment such as sensor system, plurality of RSUs, each of which may be equipped with a V2X-communication device for directly communicating with vehicles within its controllable range and other RSUs, at least to provide and/or relay road safety information/status, one or more wireless network access nodes such as LTE base stations providing cellular wireless connectivity for a remote management centre to directly communicate with plurality of road side units being equipped with a cellular communication device, and/or plurality of vehicles being equipped with cellular communication device, and indirectly communicate with plurality of vehicles equipped with only V2X communication device via a vehicle(s) and/or a RSU(s) equipped with both cellular communication & V2X communication devices acting as relay nodes. All V2X communication devices are said being equipped with a positioning radio receiver such as GPS receiver. The method including preconfiguring a V2X communication device with system reference time ($T_{REF}$) preferably in UTC (Coordinated Universal time) format indicating the time where the 1st SFN cycle or VFN cycle start, V2X communication cycle information element (IE) comprising one or several types of V2X-communication periods being used for event-triggered and/or periodic V2X application messages transmission/reception and V2X physical channel size or size for mapping V2X periodic messages, V2X offset indicator indicating the starting of the 1st V2X communication cycle within a SFN or VFN cycle, V2X-sync offset indicators, V2X communication device attributes, and other associated information elements for sidelink communication.

According to one aspect of the present invention, at power-up event that may be triggered by a vehicle ignition key for an vehicle on-board-unit, a V2X communication device may start acquiring and locking to the acquired positioning radio signal(s) such as GPS signal from which it may further extract current time preferably in UTC for coarse timing synchronization. With the preconfigured reference time ($T_{REF}$) and V2X Sync Offset Indicators, a V2X communication device may determine incoming radio frame(s) ($T_i$) and subframe(s) on which it should transmit synchronisation signal provide timing reference for further V2X signal transmission/reception within its proximity or further perform fine-timing synchronisation. The said radio frame(s) with starting ($T_i$) may satisfy the relation (($T_i$−$T_{REF}$)mod 1024=⌊V2XSync offset indicator/10⌋). A V2X communication device equipped on a RSU may be preconfigured to periodically transmit synchronisation signal(s) on the V2X radio interface and frequency in the said allocated subframes and radio frames providing reference timing for V2X application messages transmission/reception within its proximity. On the other hand, a V2X communication device equipped on a vehicle may further perform fine-time synchronisation by scanning the preconfigured carrier frequencies for existing synchronisation signal or signals. Upon detecting an infrastructure (i.e. RSU) originated synchronisation signal(s), a vehicle bound V2X communication device may align its clock i.e. internal time for further V2X application message transmission/reception. Upon detecting only vehicle originated synchronisation signal(s), a vehicle bound V2X communication device may align its clock for further V2X application messages transmission/reception and further participate in maintaining the local reference timing by periodically performing contention together with existing vehicle bound X2V devices in the local proximity for its synchronisation signal transmission. Upon detecting no synchronisation signal(s), a vehicle bound V2X communication device may use its internal clock as reference time for synchronisation signal transmission, providing reference timing for further V2X application messages transmission and/or reception within it transmission range.

Another aspect of the present invention relates to V2X communication structure and associated methods for event-triggered and periodic V2X application messages transmission/reception. According to the present invention, there introduces a preconfigured V2X communication cycles that may be time concatenated to fit into a SFN or VFN cycle of 1024×10 ms, where the first V2X communication cycle may be further configured to offset from the start of a SFN or VFN cycle where a V2X communication device may concurrently operate with more than one preconfigured offsets. A V2X communication cycle may comprise one or more first V2X communication period reserved for event-triggered and/or non-standardised size V2X application messages transmission, and one or more second V2X communication period reserved for periodic V2X application messages transmission/reception. A first V2X communication period may always appear as starting V2X communication period in a V2X communication cycle and further comprising a SA-pool for control channels transmission providing physical layer control information for the reception and decoding of the associated data channel or channels and an associated DATA-pool for associated data channels transmission. A second V2X communication period is said to comprise only DATA-pool for data channels transmission and blind-decoding may be considered at a receiver. Data-pools of first and second V2X communication periods may be time-multiplexed on the subframe level. According to embodiments of the present invention, there is provided a method for a V2X communication device to detect unused data resources in a data-pool of the first V2X communication period and further utilise unused data resources for periodic V2X application message transmission. According to embodiments of the present invention, a data pool of the first V2X communication period and 2nd V2X communication period may be further partitioned into physical data channels where each may have configurable size of (1 subframe×NPRB-CH PRBs), and labelled with unique channel indexes being used for periodic V2X application messages transmission/reception.

Two methods are described for indexing data channels in a data resource pool and associated methods for contending for a data channels within a data resource pool for periodic V2X application messages transmission/reception at a V2X communication device.

According to a first method, a data-pool in a V2X communication period may be partitioned into sub-periods of configurable ($N_{TRP}$) subframes. Data channels are indexed on sub-period basis, first in time and then in frequency, and the index is reset to a starting value at the start of each sub-periods within the same V2X communication period. Within a V2X communication cycle, the channel index of an immediately following V2X communication period continues from the largest index value of the previous V2X communication period. The total channel indexes including unused channel indexes in a first V2X communication period and available channel indexes in a second V2X communication period in a V2X communication cycle form a contention window for periodic V2X application message transmission.

By monitoring an SA-pool of a first V2X communication period and decoding detected control channels, a V2X communication device may determine unused data channels and associated indexes in the associated data-pool of the first V2X communication period for use in periodic V2X application message transmission. A V2X communication device having a periodic V2X application message for transmission within a V2X communication cycle may randomly select a channel index within an appropriate contention window (e.g. high, normal, or low) for its first transmission and further identify data channels with the same selected channel index for retransmission. Technically, by controlling V2X communication period duration in relative to configurable ($N_{TRP}$), the number of retransmissions can be adjusted correspondingly.

According to a second method, a data-pool in a V2X communication period may be partitioned into sub-periods of configurable ($N_{TRP}$) subframes. Data channels are indexed on sub-period basis, first in time and then in frequency, and the channel index of an immediately following sub-period continues from the largest index value in the previous sub-period within the same V2X communication cycle. The total channel indexes including unused channel indexes in first V2X communication period(s) and available channel indexes in second V2X communication period(s) in a V2X communication cycle form a contention window for periodic V2X application messages transmission. A V2X communication device having a periodic V2X application message for transmission within a V2X communication cycle may randomly select a channel index within then appropriate contention windows (e.g. high, normal, or low). Within the sub-period in which the channel index is selected, a V2X communication device further determines "Time Resource Pattern Index(es)" that include the selected channel index. If there is more than one "Time Resource Pattern Index" being identified, a V2X communication device further randomly select a "Time Resource Pattern Index" for use in periodic V2X application messages transmission and retransmissions.

On V2X communication period basis, when comparing the second method to first method, the second method provide higher number of data channels for contention. However, the second method may result in collision on retransmissions, which is not the case for the first method. Technically, both first and second methods can be configured and recommended to coexist on different V2X communication periods within a V2X communication cycle serving for different types of periodic V2X application messages.

Advantages of embodiments of the present invention include an ability to provide two-phase timing synchronisation. In the first phase, coarse timing synchronisation can be achieved by using positioning system such as GPS, standardised timing and predefined reference system time (preferably in UTC for the purpose of reusing existing V2X applications on LTE based V2X platform) from which exact radio frames and subframes for scanning existing synchronisation in second phase where the fine timing synchronisation is further achieved.

Furthermore, embodiments of the present invention provide a vehicular wireless communication system in which an infrastructure bound V2X communication device is preferred for transmitting synchronisation signals providing reference timing for V2X signal transmission/reception within it proximity.

Yet further again, embodiments of the invention provide a method for reference timing in local proximity being maintained jointly by more than one vehicle bound V2X communication device, where departure of a vehicle bound V2X communication device does not impact the local timing reference.

Embodiments of the invention provide a V2X communication structure and associated methods for transmitting event-triggered and periodic V2X application messages, where configuration/reconfiguration of V2X communication structure information elements may be further carried out at application level allowing further customisation/optimisation on deployed application basis.

Further embodiments provide a standard configuration for an on-board vehicle V2X communication device capable of acting as intermediate for identifying nearby hidden vehicles/obstacles.

Yet further embodiments provide extended configuration for an on-board vehicle V2X communication device capable of acting as relay providing communication between standard on-board vehicle V2X communication device and remote management centre, hence reducing cellular network load due to managing vehicles on cellular radio interface.

Finally, embodiments of the invention providing a basic configuration for a V2X communication device being installed on a roadside unit.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

Advantageous Effects of Invention

According to the present invention, it is possible to provide the improved V2X communication methods and systems.

BRIEF DESCRIPTION OF DRAWINGS

Various embodiments of the invention will be described with reference to the following drawings.

DESCRIPTION OF EMBODIMENTS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

Figure 1:
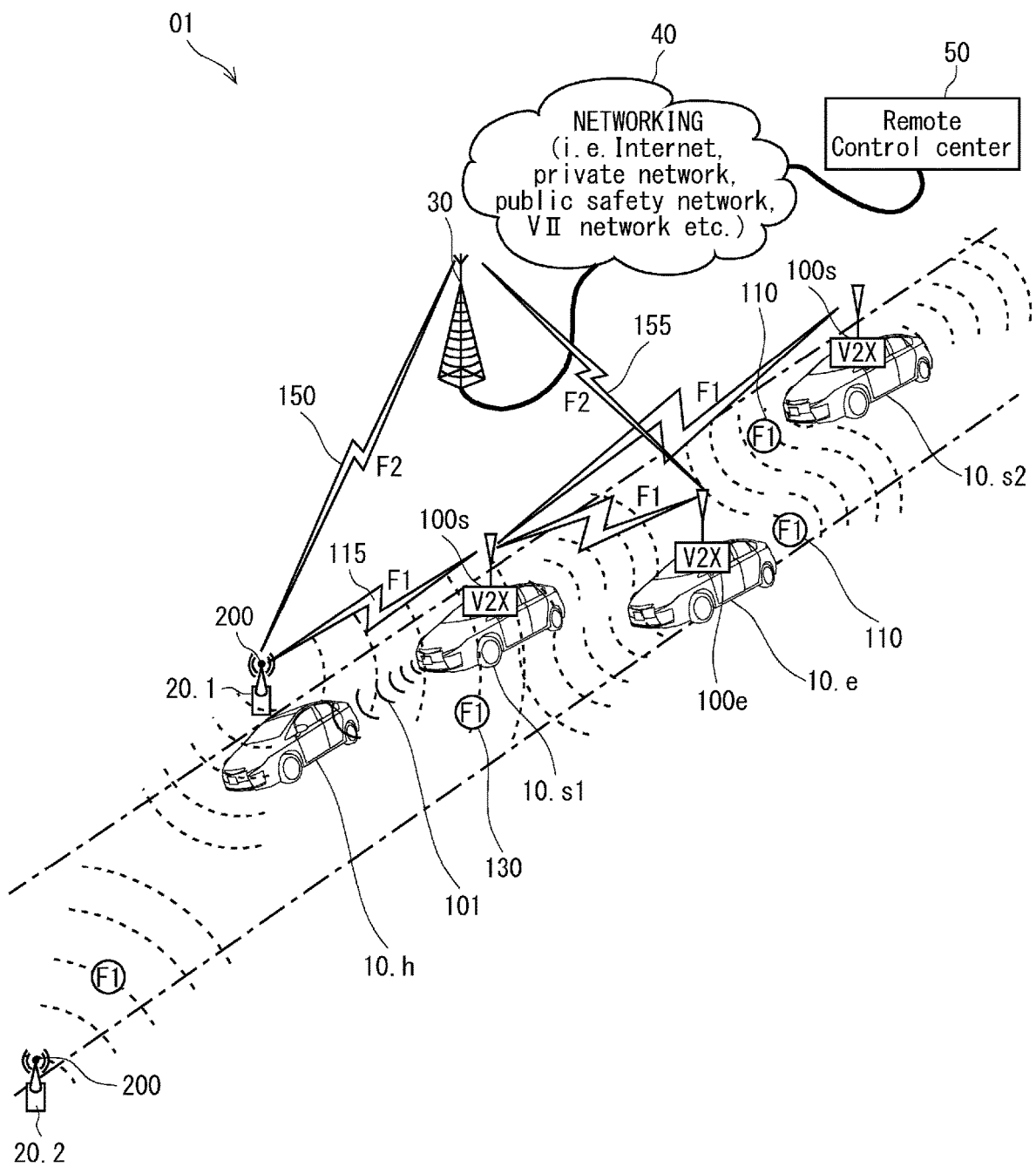
FIG. 1 schematically illustrates a V2X communication system, according to an embodiment of the present invention.

FIG. 1 schematically illustrates a V2X communication system 01, according to an embodiment of the present invention. As discussed in further detail below, the system 01 implements methods for establishing system timing reference, acquiring and maintaining timing synchronisation, and transmitting/receiving periodic and/or non-periodic V2X messages.

The V2X communication system 01 includes an ad-hoc wireless network comprising a plurality of vehicles 10, some of which are equipped with a V2X communication device 100e, 100s for directly communicating with other vehicles 10, with road side units 20, and/or portable devices carried by individuals (not illustrated), which are capable of V2X communication. Such communication may include exchanging of periodic and/or non-periodic/event-triggered V2X related application messages, such as standardised cooperative awareness messages (CAMs), as discussed above.

The road side units 20 are equipped with a V2X communication device 200 for providing time reference and for directly communicating with nearby vehicles 10 capable of V2X communication 10.s1, 10.s2 and 10.e.

The system 01 also includes a network access node 30 in the form of a cellular base station, such as an eNB in LTE, for providing cellular coverage and services, including V2X communication related configuration, to vehicles 10 and road side units 20 capable of cellular communication. The network access node 30 enables communication with a remote management centre 50 via a data communications network 40.

The vehicles 10 may be road vehicles such as automobiles or motorcycles for transporting passengers and/or cargo. Furthermore, the vehicles may be in daily use or in mission critical usage.

The plurality of vehicles 10 include standard V2X vehicles 10.s, which are equipped with standard V2X communication devices 100s enabling V2V, V2I, and V2P communication over a PC5 interface on carrier frequency F1. The plurality of vehicles 10 further includes extended V2X vehicles 10.e, which are equipped with extended V2X communication devices 100e enabling V2V, V2I, and V2P communication over PC5 interface on carrier frequency F1, and V2N communication over a radio interface (e.g. a Uu interface) on carrier frequency F2.

In some region, the carrier frequencies F1 and F2 may be configured to be the same frequency, and therefore V2V, V2I, V2P and V2N communications may share the same carrier frequency F1 or F2.

The plurality of vehicles 10 include hidden vehicles 10.h, which are not be equipped with a V2X communication device 100, and are therefore unable to communicate with the standard and extended V2X vehicles 10.s, 10.e. A hidden vehicle 10.h may be detected by traditional on-board equipment, such as sensor/radar signal 101 from a nearby vehicle 10.s1 or RSU 20, and attributes of the hidden vehicle 10.h may be relayed by the vehicle 10.s1 or the RSU 20, for example periodically, to other vehicles 10 and/or RSUs 20 in the region. As such, the hidden vehicle 10.h is made visible to vehicles 10.s1 and 10.e that are not near the hidden vehicle 10.h.

Figure 2:
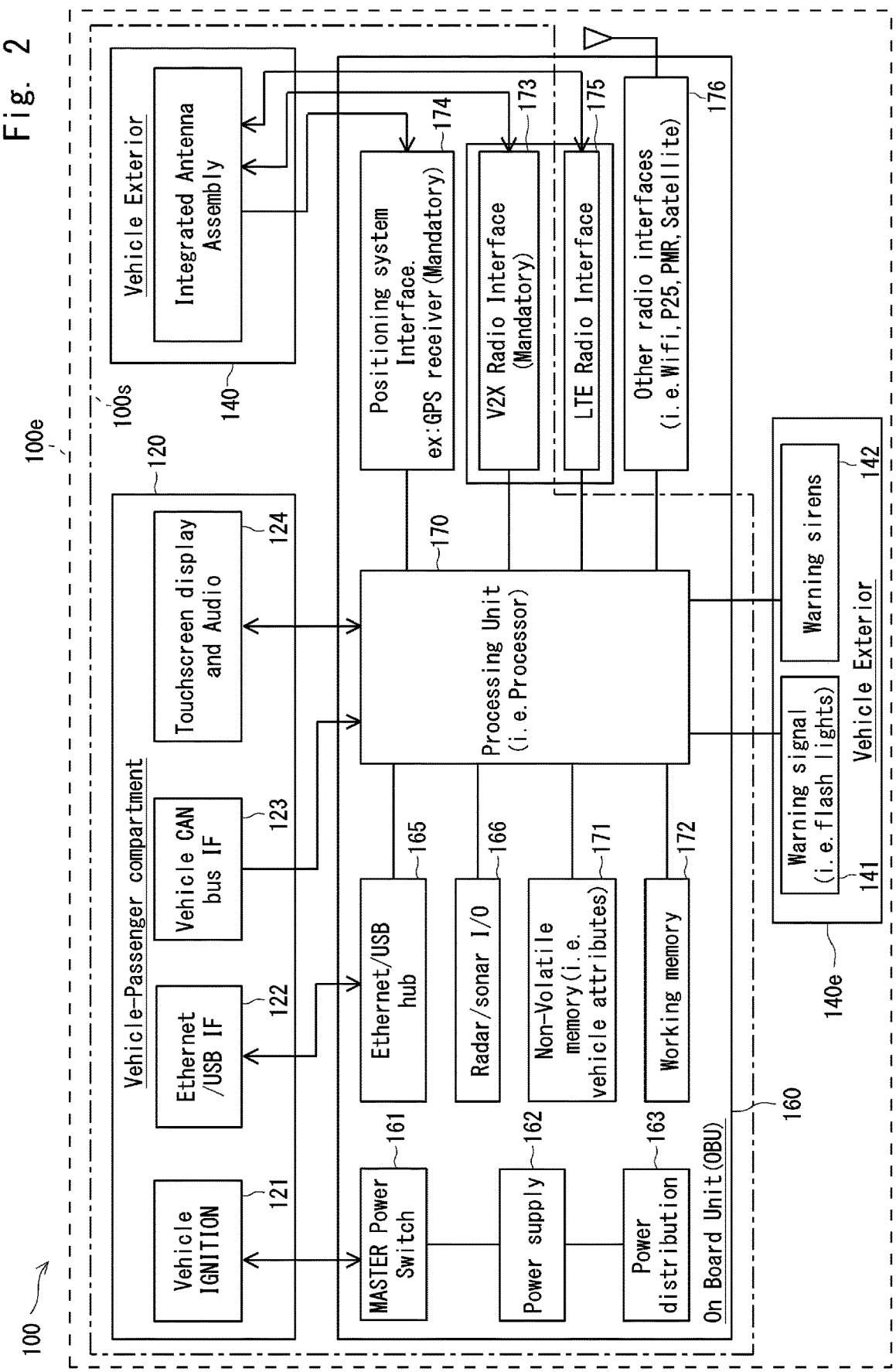
FIG. 2 illustrates a schematic of a V2X communication device of a vehicle on board unit of the system of FIG. 1, according to an embodiment of the present invention.

FIG. 2 illustrates a schematic of the V2X communication device 100 of the system 01, according to an embodiment of the present invention.

The communication device 100 includes a vehicle passenger compartment subsystem 120, an OBU subsystem 160 and a vehicle exterior subsystem 140, 140e.

The vehicle exterior subsystem 140 comprises an integrated antenna assembly for positioning system RF signal reception, such as GPS signal reception, V2X RF signal transmission and reception, and cellular RF signal transmission and reception, such as 3GPP LTE RF signal transmission and reception.

The vehicle passenger compartment subsystem 120 comprises a vehicle ignition module 121 that controls a "MASTER Power Switch" 161 of the OBU 160. The OBU 160 is configured to be powered-up and operational when it detects a vehicle ignition key 121 changing from an OFF position to an ON position. The OBU 160 may further remain operational for a configurable period of time from the time when the vehicle ignition key 121 changes from ON to OFF position, or while the warning/hazard lights of the vehicle are activated, and even when the vehicle ignition key 121 is in the OFF position.

The Vehicle passenger compartment subsystem 120 further comprises an ethernet and/or USB interface 122 that is designed to provide direct access to the OBU 160 for diagnosis purposes. This interface 122 may be further used as regulated power supply and/or for providing data gateway services to portable devices.

The vehicle passenger compartment subsystem 120 further comprises a vehicle CAN bus interface 123 that is configured to interface with the vehicle's OBU 160 to access vehicle information and status such as brake-light on, warning/hazard system/light activated, vehicle speed and other vehicle's attributes. In more advanced V2X applications, the vehicle CAN bus interface 123 may further allow V2X application in the OBU 160 to command the vehicle to take evasive action upon a detected danger. In other applications, the vehicle CAN bus interface 123 may also remotely access vehicle operational/performance parameters via from the OBU 160, for the benefit of the vehicle manufacturer, a repairer, or the like.

Finally, the vehicle passenger compartment subsystem 120 includes a touchscreen display and audio unit 124, which enables the V2X communication device 100 to interface with the vehicle's driver to provide the driver a global view of traffic and/or road conditions, highlight points of danger visually and/or audibly to enable the driver to take evasive action, provide advice/recommendation regarding safe driving (such as speed), as well as interfaces for controlling and/or using other applications and/or services implemented within the OBU 160, such as configuring a WiFi client to become a local WiFi access point and via versa, and/or navigation.

The OBU subsystem 160 includes a power supply 162 and a power distribution module 163, which are controlled by the master power switch 161, which is triggered by the vehicle ignition 121, as discussed above. In particular, the master power switch 161 controls the power supply 162 which in turn controls the power distribution module 163, in supplying and maintaining appropriate power for a processor 170 and other modules of the OBU 160.

The OBU subsystem 160 further comprises a radar/sonar interface 166, for integrating the vehicle's traditional on-board equipment, such as radar/sonar sensor system, with the V2X communication device 100. This enables details, such as presence, information, status and attributes, of a hidden vehicle 10.h to be transmitted to other surrounding vehicles through the CAMs via V2X radio interfaces.

The processing unit 170 interacts with the CAN bus interface 123, the radar/sonar interface 166, memory modules 171, 172, a positioning radio Interface module 174, such as a GPS interface, and a V2X radio interface module 173, to provide the aforementioned V2X functionality and/or services.

The memory modules include non-volatile memory 171, such as a read-only-memory (ROM), and a working memory 172, such as RAM, DRAM, SRAM, that comprises preconfigured information and programing instructions/codes modules to be executed by the processor 170 in realising timing synchronisation for periodic/non-periodic V2X related messages transmission and reception, as discussed in further detail below.

The positioning radio Interface 174 provides raw positioning data, including current time (preferably in UTC format), latitude/longitude, speed and heading, altitude, number of referent sources such as satellites in view, fix information (e.g. GPS fit quality), and HDOP (Horizontal dilution of precision) and/or HEPE (horizontal estimation of position error). In particular, the raw positioning data is provided to the processing unit 170 for system timing and navigation applications.

The V2X Radio Interface 173 enables communication via a PC5 interface with other vehicles, with road side units capable of V2X communication, and/or with personal devices carried by individuals, which are capable of V2X communication.

The OBU subsystem 160 further comprises an LTE radio interface 175 for communication over LTE Uu interface, and a non-LTE radio interface 176, such as WiFi, PMR, P25 and/or satellite interface for voice and/or data communication.

The vehicle exterior module 140*e* comprises warning lights 141 and warning sirens 142 for use in mission critical applications. The vehicle exterior module 140*e* interfaces with and is controlled by the Processing Unit (170).

The schematic 100 illustrates a standard configuration 100*s* and an extended configuration 100*e*. The standard configuration 100*s* excludes the vehicle exterior module 140*e* and the LTE radio interface 175 and the non-LTE radio interface 176, both of which are included in the extended configuration 100*e*, along with all other elements of the standard configuration.

Figure 3:
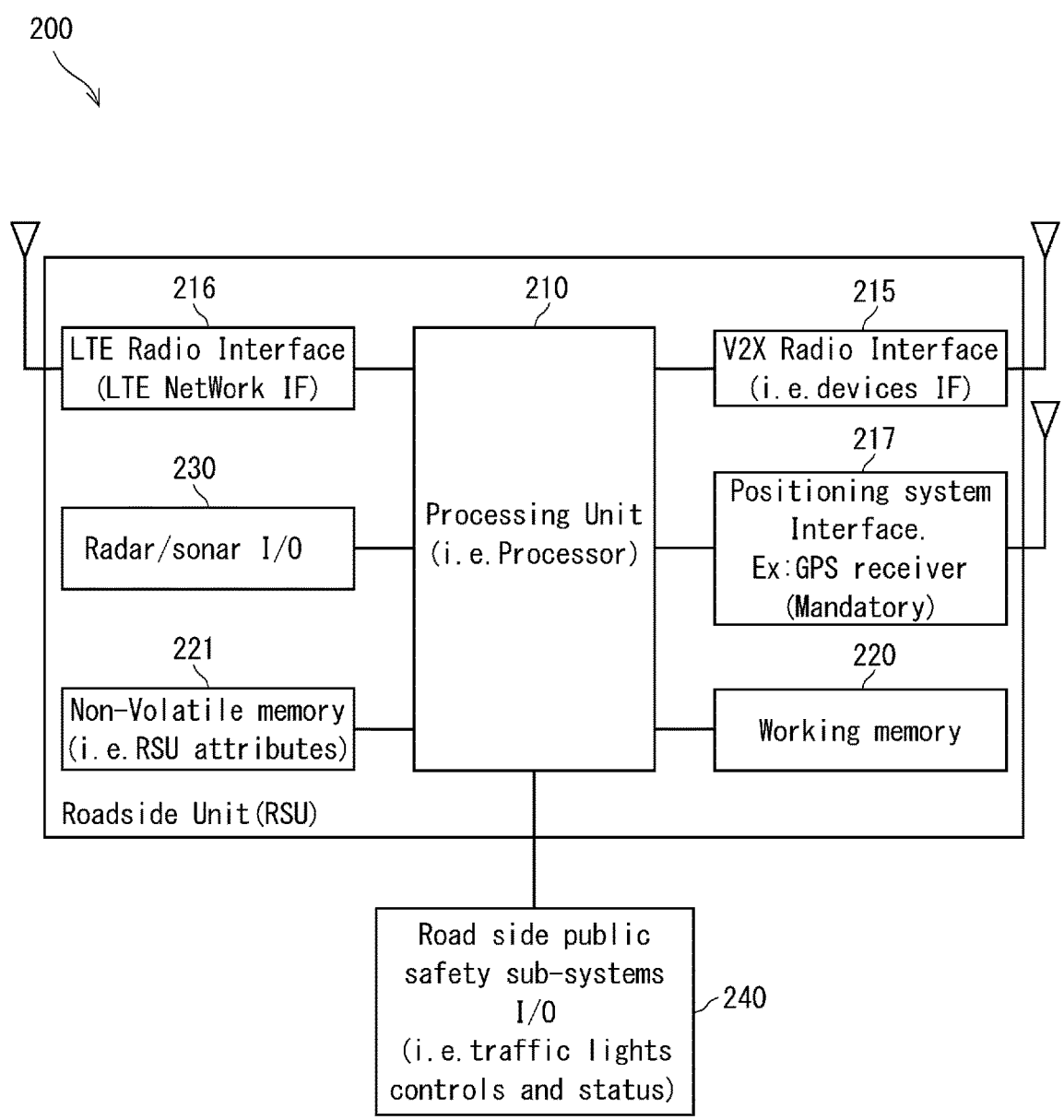
FIG. 3 illustrates a schematic of a V2X communication device of a road side unit of the system of FIG. 1, according to an embodiment of the present invention.

FIG. 3 illustrates a schematic of the V2X communication device 200 of the road side unit 20, according to an embodiment of the present invention.

The V2X communication device 200 comprises a processing Unit 210, that interacts with and controls a V2X radio interface module 215, an LTE radio interface 216, a positioning system interface module 217, such as a GPS Interface module, a radar/sonar/camera interface 230, a road safety sub-system interface 240, such as a traffic light interface, and memory modules 220, 221.

The Radar/Sonar/camera interface 230 is an interface for integrating traditional road safety equipment such as sensors, radars and cameras, with the V2X communication device 200. This enables hidden vehicles 10.*h* and unsafe events that have been detected by traditional sensors, radar or cameras, to be communicated to other nearby vehicles and road sign units. In particular, CAMs messages may be sent by the V2X radio interface 215, periodically or non-periodically (e.g. event triggered) to surrounding vehicles and/or road sign units capable of receiving such messages.

The road safety sub-system interface 240 is an interface for integrating traditional road safety equipment, such as traffic light control sub-systems, with the V2X communication device 200. The interface 240 allow the device 200 to obtain information, such as traffic light status, duration and sequence, and share this information by the V2X radio interface 215 to other vehicles. The road safety sub-system interface 240 may also inform vehicles of an optimal driving speed and appropriate driving behaviour, and may obtain traffic related information such as traffic condition i.e. number of vehicles queuing for traffic light or emergency event, and control traffic lights to improve traffic flow.

The working memory 220 may comprise RAM, DRAM or SRAM, and the non-volatile memory 221 may comprise read-only-memory (ROM). The non-volatile memory may comprise preconfigured information and programing instructions executable by the processor 210 to realise timing synchronisation of V2X related messages transmission, discussed further below.

The positioning system interface module 217, which may comprise a GPS interface module, provides raw positioning data, including current time (preferably in UTC format), latitude/longitude, altitude, number of referent sources such as satellites in view, fix data information such as GPS fix quality, and HDOP and/or HEPE, to the processing unit 210. The raw positioning data may then be used for system timing synchronisation functions and positioning related applications.

The V2X Radio Interface 215 enables communication via a PC5 interface with vehicles, RSUs and/or personal devices capable of V2X communication within its transmission range. Similarly, the LTE radio interface 216 enables communication, via an LTE Uu interface, with a remote control centre 50 and with RSUs that are not within X2V transmission range but under LTE network coverage.

Figure 4:
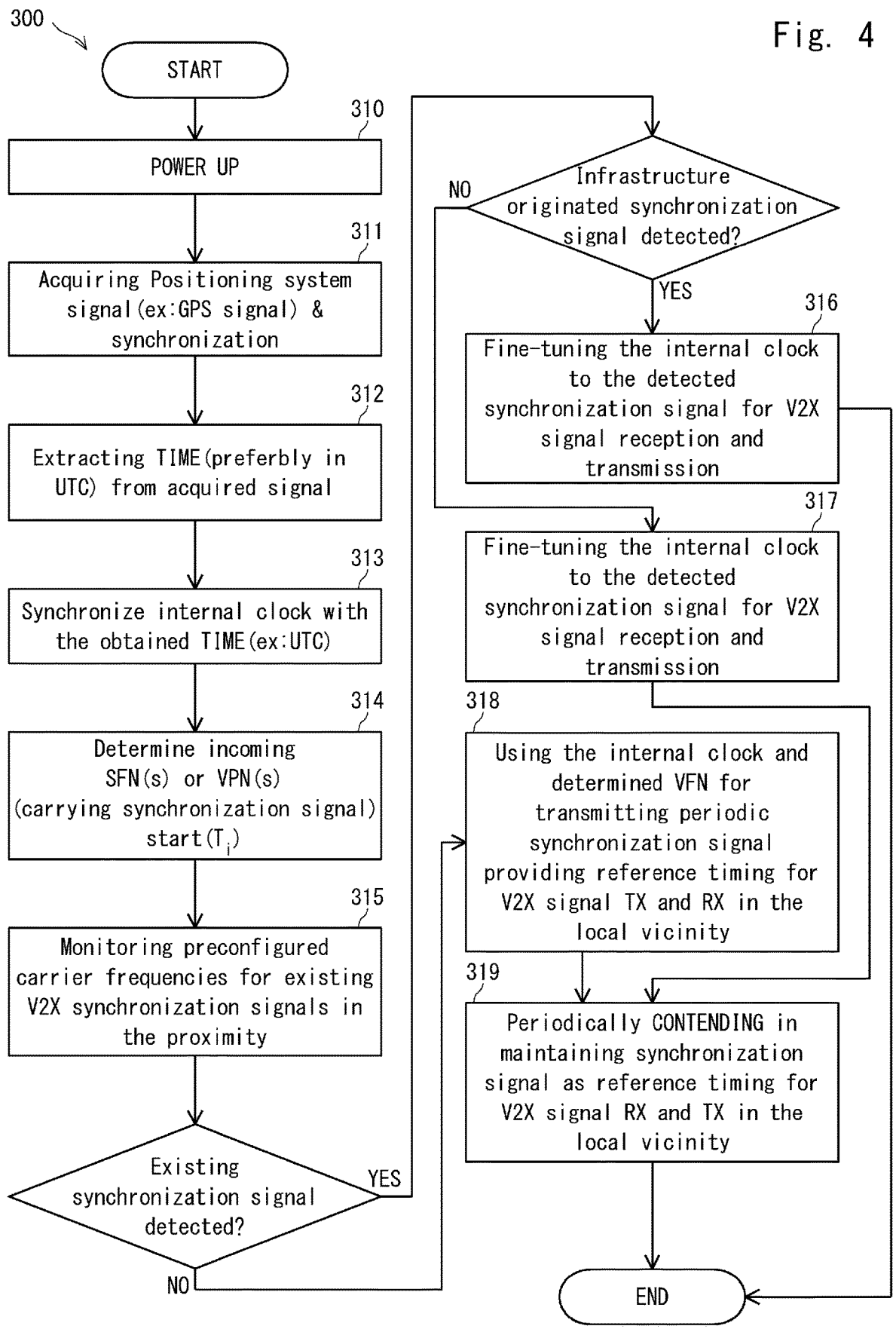
FIG. 4 illustrates a method of acquiring and maintaining system timing for V2X messages in a V2X communication device of a vehicle OBU, according to an embodiment of the present invention.

FIG. 4 illustrates a method 300 of acquiring and maintaining system timing for V2X messages in a V2X communication device of a vehicle OBU, according to an embodiment of the present invention.

The method 300 starts with a "power-up" at step 310, where the V2X device is powered up, including the processing unit 170, the V2X radio interface 173, the positioning interface 174.

At step 311, a positioning system signal is acquired by positioning radio interface 174, for example by searching for a GPS signal and locking to a set of satellites.

As step 312, the current time is periodically extracted from the received positioning signal. The current time is preferably in UTC format and may, for example, be extracted from the GPS signal.

At step 313, an internal clock of the device is synchronised with the extracted time from the received signal to provide coarse synchronization.

At step 314, the radio frame start of incoming radio frame(s) that may carry existing V2X synchronisation signal(s) the timing $T_i$ is determined. In particular, preconfigured V2X communication parameters, such as V2X communication reference time ($T_{REF}$) and V2X sync offset indicators, are used to determine the timing $T_i$.

Figure 5:
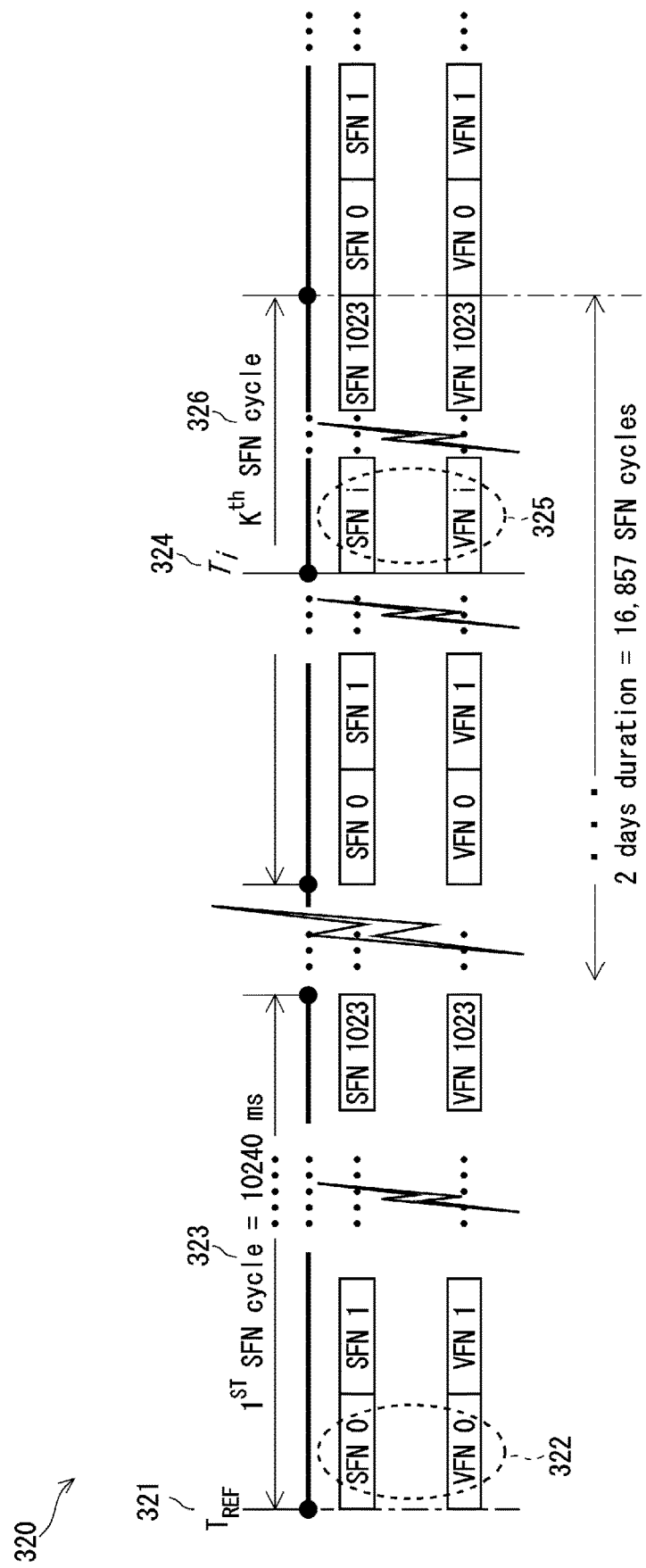
FIG. 5 illustrates an exemplary timing diagram relating to determining a start of radio frames having synchronisation signals, according to embodiment of the present invention.

Now turning to FIG. 5, the reference time $T_{REF}$ 321, i.e. where the V2X communication system time SFN 0 or VFN 0, as indicated by 322 of the first SFN or VFN cycle 323 starts or aligns, is determined. The reference time $T_{REF}$ 321 may be defined in format: {YYYY-MM-DDThh:mm:ss.sTZD}, where:

YYYY=four digit year;
MM=two digit month;
DD=two digit day of month;
hh=two digit hour;
mm=two digit minute;
ss=two digit second;
s=one or more digits representing decimal fraction of a second; and
TZD=time zone designator.

$T_{REF}$ May be preconfigured or predefined relative to an absolute past time for example {0000-01-01T00:00:00.0+00:00} or GPS time reference of {1980-01-06T00:00:00.0+00:00} or absolute time marking the event of V2X deployment for example {2020-01-01T00:00:00.0+00:00}.

The timing $T_i$ 324 of radio frame SFN(i) or VFN(i) 325 in the $k^{th}$ SFN or VFN cycle 326 satisfies the relationship:

$$((T_i - T_{REF}) \bmod 1024 = \lfloor V2X\text{Sync offset indicator}/10 \rfloor).$$

At step 315, preconfigured carrier frequencies are monitored for existing synchronisation signals.

Figure 6:
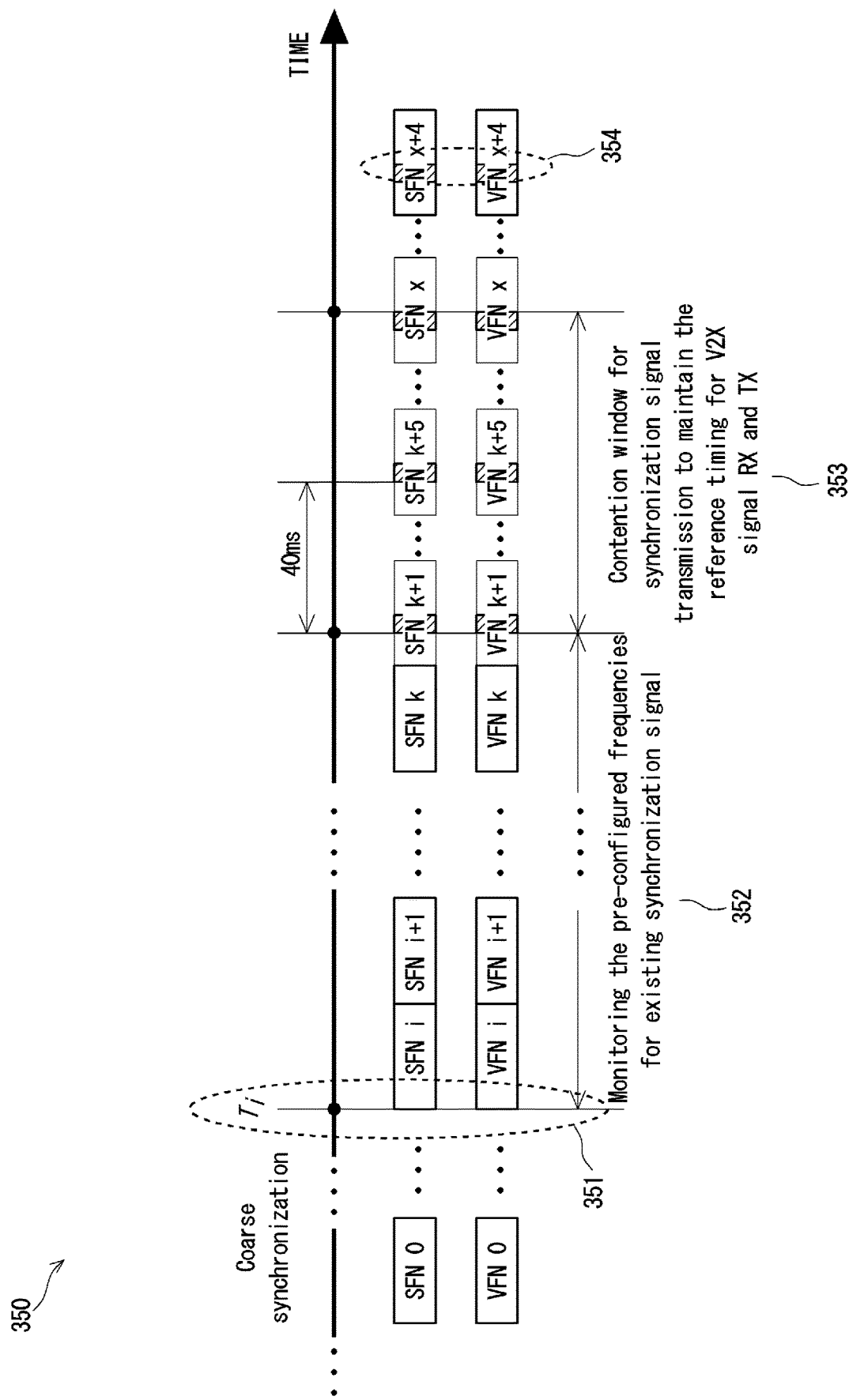
FIG. 6 illustrates an exemplary timing diagram illustrating contention for synchronisation signals transmission in joint maintenance of local referent timing, according to embodiment of the present invention.

As illustrated in exemplary timing diagram 350 of FIG. 6, the preconfigured carrier frequencies are monitored for existing synchronisation signals from the determined $T_i$ 351 for an implementation dependent period 352.

If a V2X synchronisation signal is detected, and the detected synchronisation signal originates from a V2X device installed in infrastructure, such as an RSU, the internal timing is then refined based on the detected synchronisation signal at step 316.

The refined internal timing is then used for further V2X application messages. periodic and/or non-periodic, reception and transmission on further V2X communication cycles, where V2X communication cycle may be preconfigured for broadcast by the infrastructure bound V2X device.

If the detected synchronisation signal originates from a V2X device installed in a vehicle, the internal timing is refined based on the detected synchronisation signal at step 317 for further V2X signal transmission and reception.

In maintaining the reference timing in the region without an infrastructure bound synchronisation signal as reference timing, contention for transmitting a synchronisation signal is periodically performed at step 319 while transmitting and receiving periodic and non-periodic V2X application messages.

If no V2X synchronisation signals are detected, the device uses its internal clock as reference timing for transmitting periodic synchronisation signal providing reference timing for V2X signal transmission and reception at step 318. The device may be configured to operate in jointly maintained timing reference mode where it will further periodically performing contention for transmitting the synchronisation signal at step 319 while transmitting/receiving periodic and non-periodic V2X application messages.

In contending for synchronisation signal transmission as discussed above with reference to step 319, a vehicle installed V2X device randomly selects a window size in an integer number of 40 ms in the range of [0, 1, 2, 3, 4] to monitor a synchronisation signal from other V2X devices 353. If there is no synchronisation signal is detected within a randomly selected window, the device will transmit its synchronisation signal on the preconfigured subframe immediately after the window timing end 354.

As mentioned previously, the embodiments of the present invention also relate to the configurable V2X communication structure and associated methods for transmitting from and/or receiving at a V2X device periodic and/or non-periodic/event-triggered V2X application messages.

Figure 7:
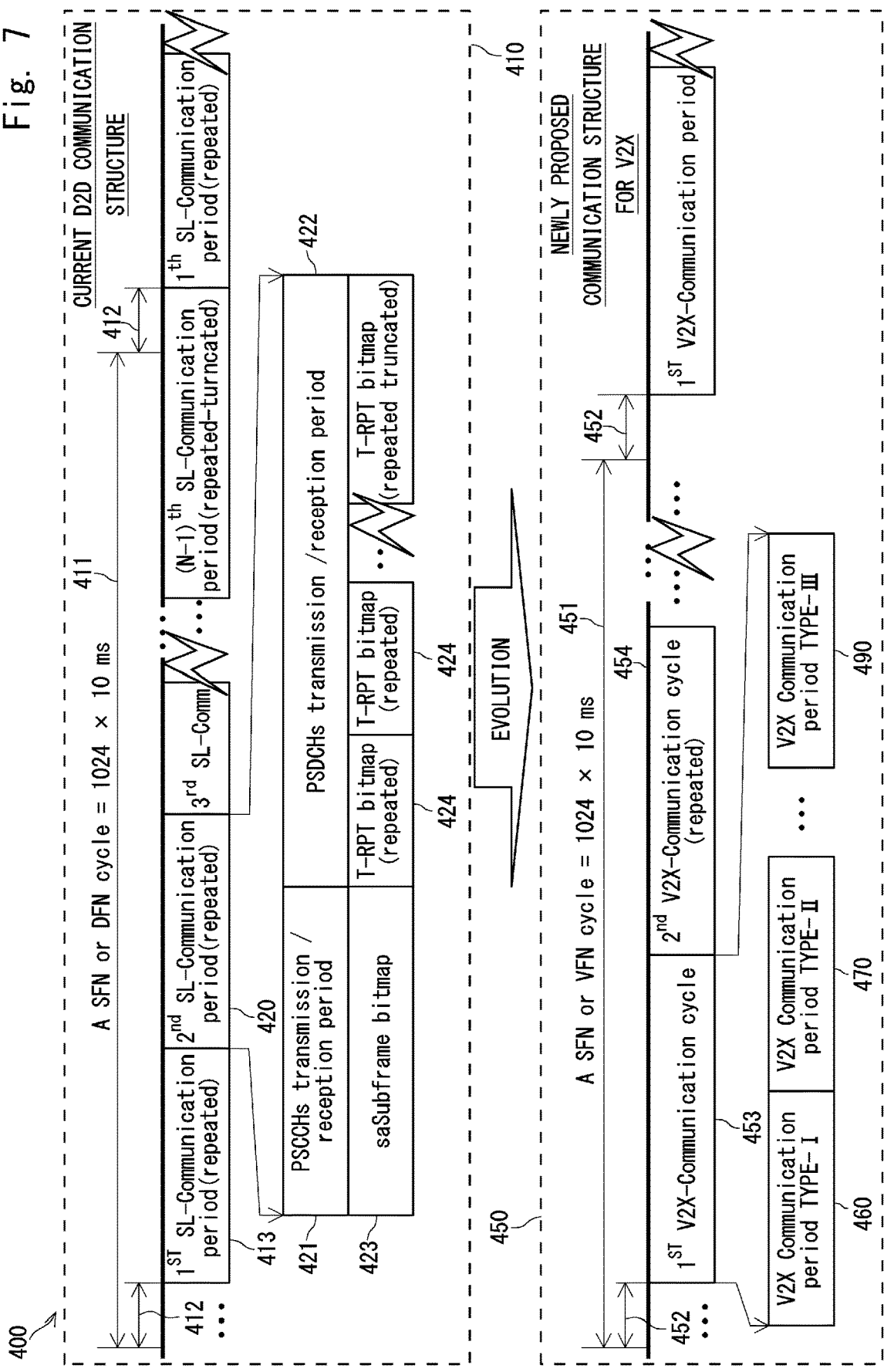
FIG. 7 illustrates a V2X communication structure, according to an embodiment of the present invention.

FIG. 7 illustrates a V2X communication structure 450, according to an embodiment of the present invention, with reference to a 3GPP LTE Release 12 Mode-2 D2D communication structure 410.

The 3GPP Mode-2 D2D structure 410 consists of identical & configurable SL-communication periods 413, 420 that are concatenated for fitting into a SFN cycle, when in coverage, or a DFN cycle, when out of coverage, of 1024×10 ms 411.

A first SL-communication period 413 is offset from a start of SFN 0 or DFN 0 by an offset 412 selected in range of Offset Indicator=[0:10239] ms and the last SL-communication period may be truncated.

A SL-communication period may be preconfigured or configured/reconfigured with value selected in the range of [40, 60, 70, 80, 120, 140, 160, 240, 280 360] subframes, and each SL-communication period 420 consists of an SA pool 421 for PSCCHs transmission/reception and a datal pool 422 for PSDCHs transmission/reception.

The SA pool 421 is associated with a "saSubframe" bitmap 423 indicating which subframes are allocated for PSCCH transmission. Pairs of PRBs in those subframes are defined as channels labelled with unique channel indexes. A D2D receiving device shall monitor all channels with valid channel indexes in the SA-pool, upon successfully detected PSCCH(s), and a D2D receiving device shall follow the detected control information including frequency resources, MCS, timing resource i.e. T-RPT 424 for receiving and decoding the associated PSSCH(s) in the associated datapool.

According to 3GPP LTE Release 12 specifications, a D2D transmitting device shall perform contention for SA transmission by randomly selecting a channel index and on the corresponding pair of PRBs transmitting PSCCH, provide control information for the reception and decoding of associated PSSCH(s) being transmitted on the associated datapool. Technically, the 3GPP LTE Release 12 D2D communication was designed mainly for user originated data transmission including voice packages which may have variable size.

However, in V2X applications, most messages are machine-generated for machine-to-machine communication and include, for example, periodic-broadcasted CAMs that are automatically and periodically generated by a V2X device on board a vehicle providing the location and status information of the vehicle to other surrounding vehicles. That type of CAM may consist of fixed fields such as vehicle's attributes and status, time-stamp, latitude and longitude, speed, heading, risk identification code, emergency code and etc. Therefore, a periodically-broadcasted V2X application message for a particular use may be predefined and may have fixed sizes, known channel encoding rates, known modulation, making blind detection and decoding, i.e. without requiring fast signalling in the form of associated control channels, possible at the V2X receiver.

Depending on V2X application type and/or conditions/environment, the transmission frequency of periodic V2X application messages may be different, varied in time in a device, and varied from device to device. Furthermore, in V2X communication, an event-triggered V2X application message may be periodically broadcasted or unicasted/group-casted targeting a device(s) on a particular vehicle or group of vehicles until the said event is no longer applicable. This type of V2X message may require a control channel to correctly receive and decode a data channel only at the intended devices. As such, the V2X communication structure 450 may be configured and/or customised in transmission and/or reception of variations of periodic, non-periodic, and/or event triggered V2X application messages.

The V2X communication structure 450 comprises identical, configurable and repeatable V2X-communication cycles 453, 454 that may be multiplexed in time or in frequency or the combination of time-frequency, to fit into a SFN cycle (in coverage) or VFN cycle (in and out of coverage) of 1024×10 ms 451. The first V2X-Communication cycle 453 is offset by an offset 452 selected in range of V2X Offset Indicator=[0:10239] ms from a start of SFN 0 or VFN 0, and the last V2X-communication cycle may be truncated (not shown). A preconfigured or configured V2X-communication cycle comprises at least one V2X-Communication period type in the form of a TYPE-I period 460, a TYPE-II period 470 and a TYPE-III period 490. The V2X-communication cycle may be configured to support a particular V2X application, or two or more V2X-Communication period types 460, 470, 490, and thus be configured to support one or several V2X applications.

A configured V2X-communication cycle may comprise one or more V2X-Communication TYPE-I periods 460 (also referred to as first communication periods) being reserved for event-triggered unicasted/group-casted and/or non-standardized-size V2X application messages that further comprise an SA-pool for control channel mapping and associated data-pool for associated data channels mapping. The cycle may further comprise one or more V2X-Communication TYPE-II periods 470 (also referred to as second communication periods using a first method of indexing data channels) comprising only a data-pool for data channel mapping, which may be time-multiplexed or time-interleaved, for a periodic and standardised-size V2X application messages transmission/reception. Finally, the communication cycle may comprise at most one V2X-Communication TYPE-III period 490 (also referred to as second communication periods using an alternative method of indexing data channels) for other periodic and standardised-size V2X application messages that further comprises only data-pool for data channels mapping.

In a V2X-communication cycle, by monitoring the SA-pool of a V2X-Communication TYPE-I period 460, a V2X device having periodic V2X application messages for transmission may be able to identify unused data channels within the associated data-pool and further include unused data channels into a contention window for its periodic and standardised-size V2X application messages transmission.

Figure 8:
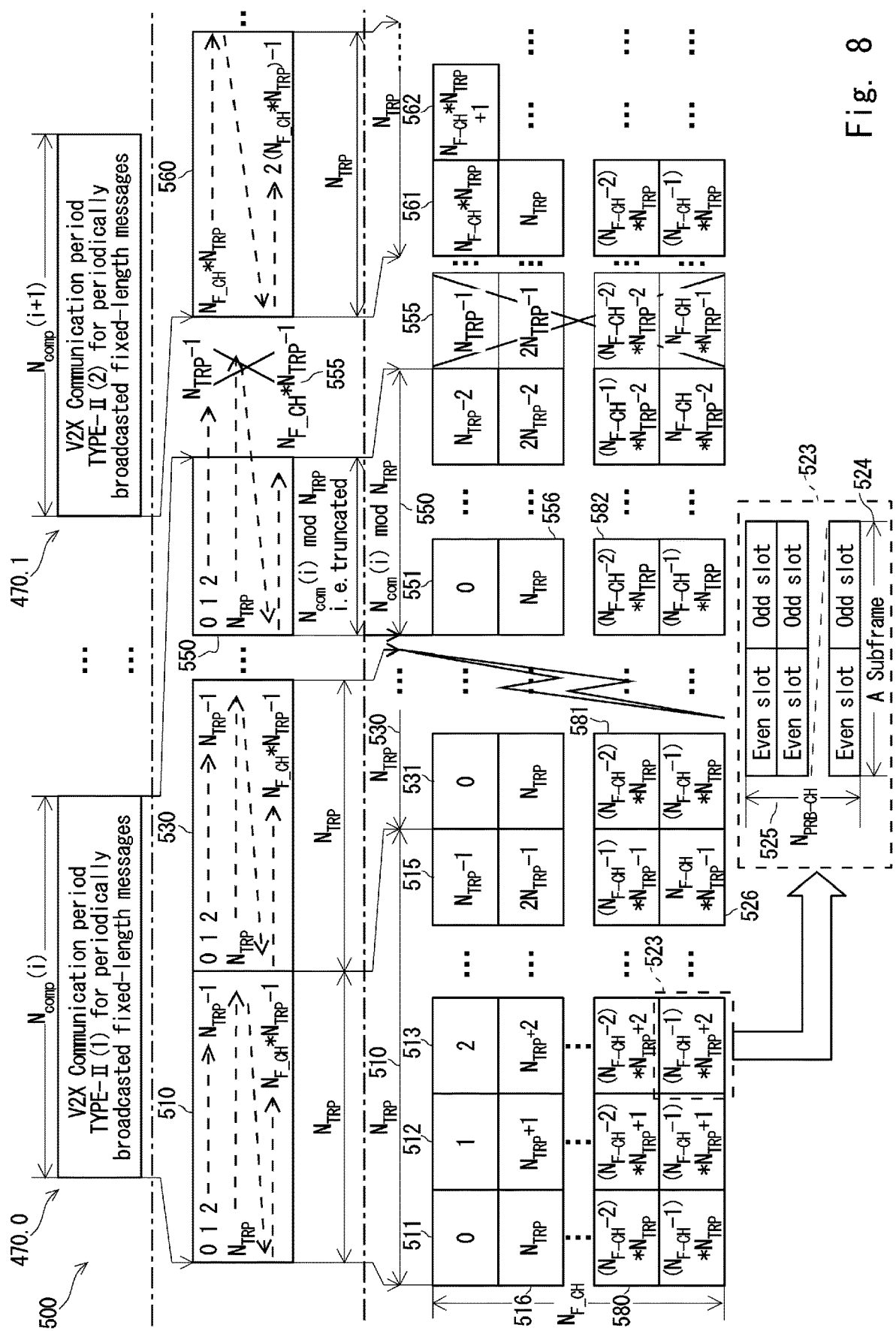
FIG. 8 illustrates a V2X communication structure and method of indexing data channels, according to an embodiment of the present invention.

FIG. 8 illustrates a V2X communication structure 500, according to an embodiment of the present invention.

In particular, a V2X-Communication TYPE-II period of duration $N_{ComP}(i)$ 470.0 or $N_{ComP}(i+1)$ 470.1 in may be preconfigured or configured to comprise one or more sub-periods 510, 530, 550 in of length $N_{TRP}=\{6, 7, \text{ or } 8\}$. The last sub-period 550 may be truncated as illustrated by truncation 555 to fit into $N_{ComP}(i)$. Within the first sub-period 510, data channels are indexed starting from 0 at a first data channel 511 increasing in time at subsequent data channels 512, 513, 515 and then in frequency at parallel data channel 516.

The last channel in the sub-period has an index $(N_{F-CH}*N_{TRP}-1)$ 526 where $(N_{F-CH})$ is the number of data channels in the frequency domain. Each data channel such as channel 523 may be configurable occupying $N_{PRB-CH}$ of physical resource blocks 525 for a duration of a subframe 524. The indexing is reset to a starting value for every sub-period 531, 551 within a V2X-Communication TYPE-II period. For a truncated sub-period 550, channel indexes in the truncated region 555 are not available for use. By controlling the configurable $N_{ComP}(i)$ in relative to configurable $N_{TRP}=\{6, 7, \text{ or } 8\}$, the number of repeated channel indexes 580, 581, 582 in a V2X-Communication period TYPE-II can be controlled for retransmission use.

In the case where more than one V2X-Communication TYPE-II period are configured within a V2X-communication cycle, as illustrated by communication periods 470.0, 470.1, the first channel index 561 of the followed V2X-Communication period TYPE-II 470.1 continues from the last index 526 of the previous V2X-Communication period TYPE-II 470.0.

Figure 12:
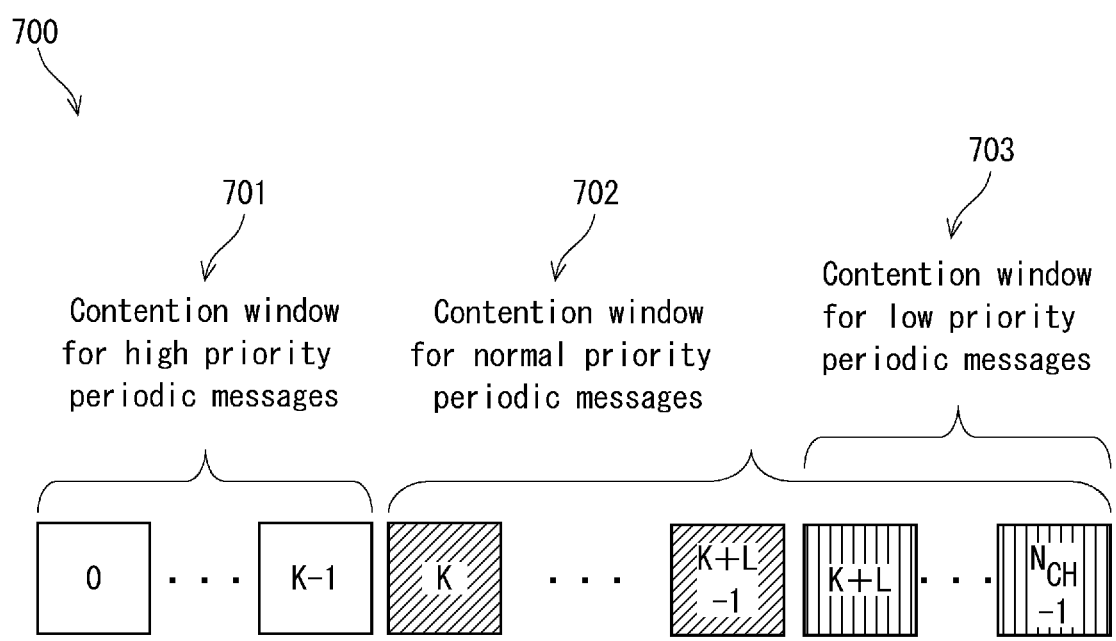
FIG. 12 illustrates exemplary partition of contention window, according to an embodiment of the present invention.

With reference to FIG. 12, the total number of channel indexes of the V2X-Communication period TYPE-II in a V2X-Communication cycle forms contention window 700 for a periodic V2X application messages transmission. The contention window 700 is then further partitioned into a non-overlapping contention window 701 having channel indexes from 0 to (K−1) for high priority message contention, and overlapping contention windows 702, 703 having channel indexes from K to $(N_{CH}-1)$ and (K+L) to $(N_{CH}-1)$ for transmission of normal and low periodic V2X application message contention respectively.

Figure 9:
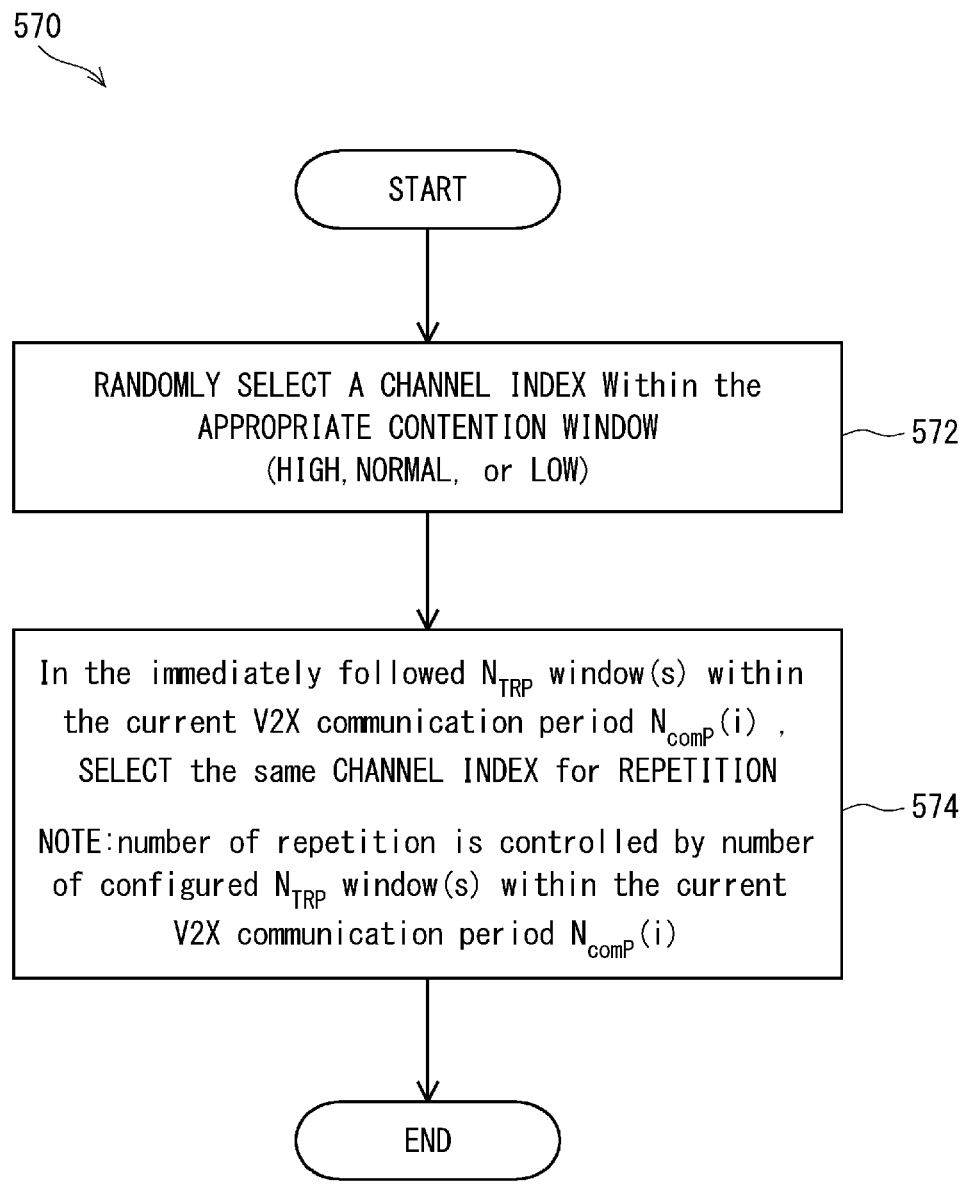
FIG. 9 illustrates a method of contention for a data channel, according to an embodiment of the present invention.

FIG. 9 illustrates a method 570 of contention for a data channel, according to an embodiment of the present invention. In particular, a V2X communication device which has periodic V2X applications messages for transmission in a V2X-Communication cycle using V2X-Communication period TYPE-II may perform contention for a data channel using the method 570.

At step 572, the V2X communication device randomly (or by other means) selects a channel index within the appropriate contention window for the first transmission. At step 574, the device identifies data channels with the selected channel index for retransmission versions. A benefit of V2X-Communication TYPE-II periods is that number of repetitions can be controlled and are evenly distributed in time within a V2X-Communication TYPE-II period, thus achieving controllable time diversity gain.

Figure 10:
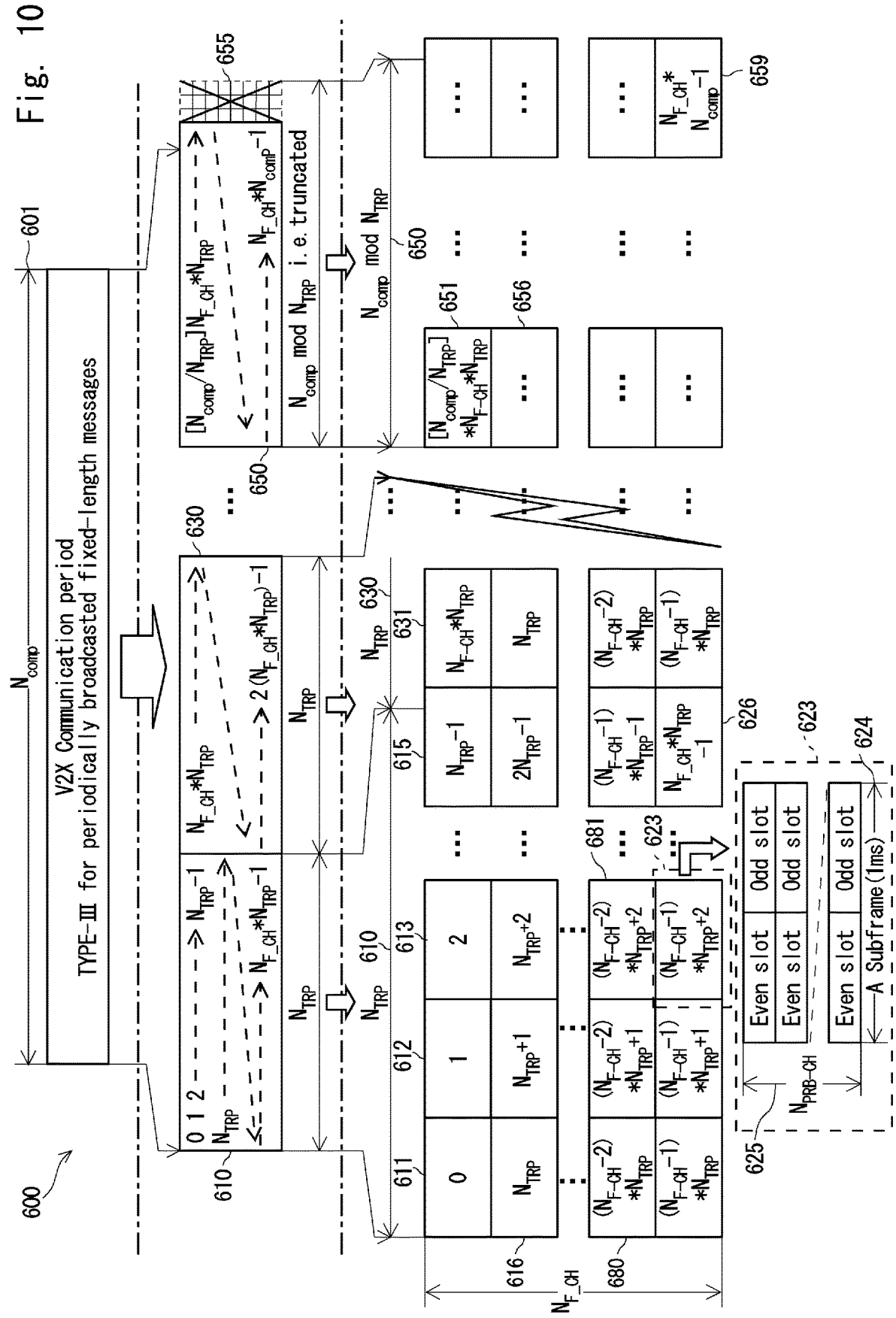
FIG. 10 illustrates a V2X communication structure and alternative method of indexing data channels (i.e. a V2X-Communication TYPE-III period), according to an embodiment of the present invention.

FIG. 10 illustrates a V2X communication structure 500, comprising a V2X-Communication TYPE-III period 600 of duration $N_{ComP}$ 601, according to an embodiment of the present invention.

The V2X-Communication period TYPE-III 600 comprises a plurality of sub-periods 610, 630, 650 in the time domain of length $N_{TRP}=\{6, 7, \text{ or } 8\}$. The last sub-period 650 is truncated by truncation 655 to fit into $N_{ComP}$.

Starting from the first sub-period 610, data channels are indexed starting with a first data channel 611 at index 0 and increasing first in time with subsequent channels 612, 613, 615 and then in frequency with parallel channels 616.

The last channel 626 in the sub-period 610 has index $(N_{F-CH}*N_{TRP}-1)$, where $(N_{F-CH})$ is the number of data channels in the frequency domain. Each data channel, such as channel 623, is configurable or pre-configured to occupy $N_{PRB-CH}$ physical resource blocks 625 for a duration of a subframe 624.

The channel starting index 631 of a followed sub-period 630 continues from a last index 626 of the previous sub-period 610. Total number of channel indexes [0: $(N_{F\_CH}*N_{ComP}-1)$] of the V2X-Communication period TYPE-III in a V2X-Communication cycle forms a contention window 700 (or "data channel resources pool"), as illustrated in FIG. 12. In particular, the contention window 700 is partitioned into a non-overlapping contention window 701 having channel indexes from 0 to (K−1) for high priority message contention, and overlapping contention windows 702, 703 having channel indexes from K to $(N_{CH}-1)$ and (K+L) to $(N_{CH}-1)$ for transmission of normal and low periodic V2X applications messages respectively.

Figure 11:
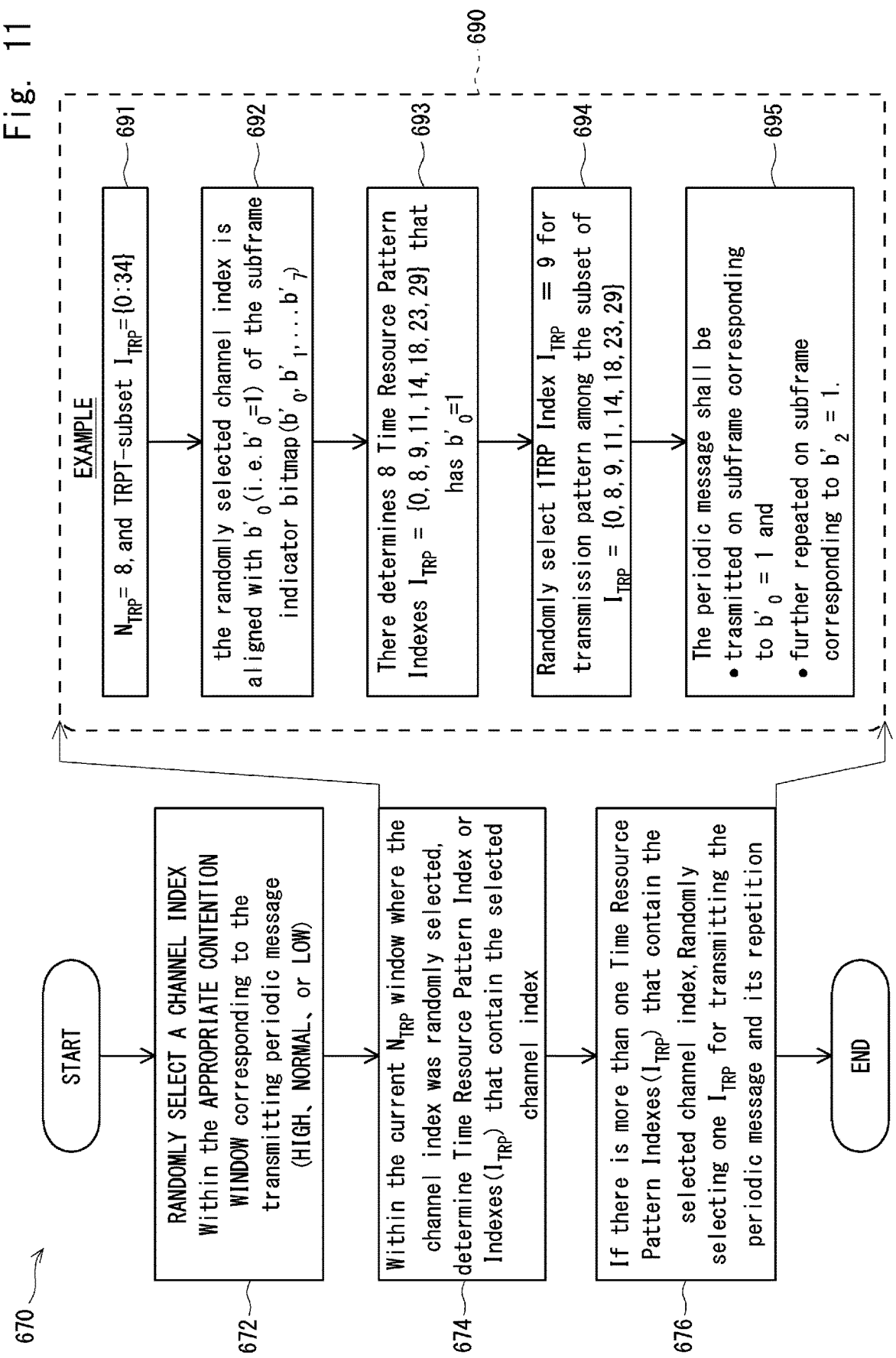
FIG. 11 illustrates a method of performing contention for a data channel or channels being indexed using the alternative method (i.e. V2X-Communication TYPE-III period), according to an embodiment of the present invention.

FIG. 11 illustrates a method 670 of performing contention for a data channel or channels in V2X-Communication TYPE-III period, according to an embodiment of the present invention. The method may be performed by a V2X communication device having a periodic V2X application message for transmission.

At step 672, a channel index is randomly (or otherwise) selected within the appropriate prioritised contention window (high, normal or low). For example channel index indicated with 680 may be selected.

At step 674, "Time Resource Pattern Indexes" $(I_{TRP})$ that contains the selected channel index within the sub-period $N_{TRP}(i)$ that the randomly selected channel index belongs to (i.e. 610 that has 680).

This step is further clarified with reference to example 690 as follows. Given configured $N_{TRP}$=8, ($I_{TRP}$={0:34}) 691, and the randomly selected channel index 680 within $N_{TRP}(0)$ 610 which is aligned with $b'_0$ (i.e. $b'_0$=1) of the subframe indicator bitmap ($b'_0$, $b'_1$, ... $b'_7$), there may be eight (8) Time Resource Pattern Indexes having $b'_0$=1 i.e. ($I_{TRP}$=0, 8, 9, 11, 14, 18, 23, and 29) 693.

At step 676, if there is more than one ($I_{TRP}$) that contains the selected channel index, one ($I_{TRP}$) is selected randomly for transmitting the V2X application message and its repetition. For example, and again with reference to example 690, ($I_{TRP}$=9) may be randomly chosen 694. $I_{TRP}$=9 having ($b'_0$, $b'_1$, $b'_2$, $b'_3$, $b'_4$, $b'_5$, $b'_6$, $b'_7$)=(1, 0, 1, 0, 0, 0, 0, 0) 695 indicating a first transmission at $b'_0$=1 is on channel with channel index at 680 and one retransmission at $b'_2$=1 is on channel with channel index at 681.

The benefit of V2X-Communication period TYPE-III is that the number of redundancy versions or repetitions pattern inherits the predefined ($I_{TRP}$). In particular, the first transmission version and its redundancy are distributed within a sub-period dependant on the selected $I_{TRP}$. Technically, the method of indexing data channels in a V2X-Communication period TYPE-III is well suited for use in V2X-Communication period TYPE-I data-pool for identifying data channel indexes that are fully or partially used for even-triggered V2X messages and the remaining unused data channel indexes may be added to contention window for being used by in periodic V2X application message transmission.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian Patent Application No. 2015903398, filed on Aug. 21, 2015, the disclosure of which is incorporated herein in its entirety by reference.

REFERENCE SIGNS LIST

01 V2X COMMUNICATION SYSTEM
10 VEHICLE
10.s1, 10.s2, 10.e V2X VEHICLE
10.h HIDDEN VEHICLE
20 ROAD SIDE UNIT (RSU)
30 NETWORK ACCESS NODE
40 DATA COMMUNICATIONS NETWORK
50 REMOTE MANAGEMENT CENTRE
100e, 100s V2X COMMUNICATION DEVICE
101 SENSOR/RADAR SIGNAL
110, 115, 130 (F1) CARRIER FREQUENCY
120 VEHICLE PASSENGER COMPARTMENT SUBSYSTEM
121 VEHICLE IGNITION MODULE (KEY)
122 ETHERNET/USB INTERFACE
123 VEHICLE CAN BUS INTERFACE
124 TOUCHSCREEN DISPLAY AND AUDIO UNIT
140, 140e VEHICLE EXTERIOR SUBSYSTEM
141 WARNING LIGHT (WARNING SIGNAL)
142 WARNING SIREN
150, 155 (F2) CARRIER FREQUENCY
160 OBU (ON BOARD UNIT) SUBSYSTEM
161 MASTER POWER SWITCH
162 POWER SUPPLY
163 POWER DISTRIBUTION MODULE
165 ETHERNET/USB HUB
166 RADAR/SONAR INTERFACE
170 PROCESSING UNIT (PROCESSOR)
171 MEMORY MODULE (NON-VOLATILE MEMORY)
172 MEMORY MODULE (WORKING MEMORY)
173 V2X RADIO INTERFACE MODULE
174 POSITIONING RADIO INTERFACE MODULE (POSITIONING SYSTEM INTERFACE)
175 LTE RADIO INTERFACE
176 NON-LTE RADIO INTERFACE
200 V2X COMMUNICATION DEVICE
210 PROCESSING UNIT (PROCESSOR)
215 V2X RADIO INTERFACE MODULE
216 LTE RADIO INTERFACE
217 POSITIONING SYSTEM INTERFACE MODULE
220 MEMORY MODULE (WORKING MEMORY)
221 MEMORY MODULE (NON-VOLATILE MEMORY)
230 RADAR/SONAR/CAMERA INTERFACE
240 ROAD SAFETY SUB-SYSTEM INTERFACE (ROAD SIDE PUBLIC SAFETY SUB-SYSTEM INTERFACE)
410 3GPP MODE-2 D2D COMMUNICATION STRUCTURE
411 SFN OR DFN CYCLE
412 OFFSET
413,420 SL-COMMUNICATION PERIOD
421 SA POOL (PSCCHS TRANSMISSION/RECEPTION PERIOD)
422 DATAL POOL (PSDCHs TRANSMISSION/RECEPTION PERIOD)
423 SA SUBFRAME BITMAP
424 T-RPT BITMAP
450 V2X COMMUNICATION STRUCTURE
451 SFN OR VFN CYCLE
452 OFFSET
453, 454 V2X-COMMUNICATION CYCLE
460 V2X-COMMUNICATION TYPE-I PERIOD
470 V2X-COMMUNICATION TYPE-II PERIOD
490 V2X-COMMUNICATION TYPE-III PERIOD
500 V2X COMMUNICATION STRUCTURE
510, 530, 550, 560 SUB-PERIOD
511, 512, 513, 515, 516, 523, 526, 531, 551, 556, 561, 562, 580, 518, 582 DATA CHANNEL (CHANNEL INDEX)
524 SUBFRAME
525 PHYSICAL RESOURCE BLOCK
600 V2X-COMMUNICATION TYPE-III PERIOD
610, 630, 650 SUB-PERIOD
611, 612, 613, 615, 616, 623, 626, 631, 651, 656, 659, 680, 681 DATA CHANNEL (CHANNEL INDEX)
624 SUBFRAME
625 PHYSICAL RESOURCE BLOCK

700 CONTENTION WINDOW
701 NON-OVERLAPPING CONTENTION WINDOW
702, 703 OVERLAPPING CONTENTION WINDOW

The invention claimed is:

1. A method performed by a V2X (vehicle-to-everything) user equipment (UE), the method comprising:
   receiving a positioning system signal;
   determining coarse timing synchronization according to the positioning system signal, the determining comprising synchronizing an internal clock of the V2X UE with a current time extracted from the received positioning system signal;
   detecting a V2X synchronization signal in accordance with the coarse timing synchronization, the detecting comprising:
   determining a start timing of an incoming radio frame that carries the V2X synchronization signal, based on the current time and preconfigured V2X communication parameters; and
   detecting the V2X synchronization signal in accordance with the determined start timing; and
   in response to detecting the V2X synchronization signal that originates from a V2X device installed in infrastructure, determine fine timing synchronization based on the detected V2X synchronization signal.

2. The method according to claim 1, wherein the V2X synchronization signal is transmitted from a RSU (road side unit).

3. The method according to claim 1, further comprising:
   transmitting or receiving a V2X application message according to the fine timing synchronization.

4. The method according to claim 1, wherein the preconfigured V2X communication parameters comprise a V2X communication reference time and a V2X synchronization offset indicator.

* * * * *